United States Patent
Cahan et al.

(10) Patent No.: US 10,176,607 B2
(45) Date of Patent: Jan. 8, 2019

(54) INTERACTIVE PATTERN DETECTION IN DATA SETS

(71) Applicant: International Business Machines Corporation, Armonk, NY (US)

(72) Inventors: Amos Cahan, Yorktown Heights, NY (US); Bum Chul Kwon, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/415,215

(22) Filed: Jan. 25, 2017

(65) Prior Publication Data

US 2018/0211424 A1     Jul. 26, 2018

(51) Int. Cl.
    *G06F 17/30*       (2006.01)
    *G06T 11/20*       (2006.01)
    *G06T 11/60*       (2006.01)

(52) U.S. Cl.
    CPC ...... *G06T 11/206* (2013.01); *G06F 17/30572* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 5,301,313 A | 4/1994 | Terada et al. | |
| 5,625,783 A | 4/1997 | Ezekiel et al. | |
| 6,430,556 B1 | 8/2002 | Goldberg et al. | |
| 6,658,404 B1 | 12/2003 | Cecchini | |
| 9,081,879 B2 | 7/2015 | Iliff | |
| 2006/0028471 A1* | 2/2006 | Kincaid | G06T 11/206 345/440 |
| 2012/0131484 A1* | 5/2012 | Neumann | G06F 17/30696 715/769 |
| 2012/0204122 A1* | 8/2012 | Brugler | G06F 17/10 715/771 |
| 2012/0265029 A1* | 10/2012 | Fahey | A61B 5/0006 600/301 |

OTHER PUBLICATIONS

Basic EKG Refresher, downloaded @https://uthealth.utoledo.edu/depts/nursing/pdfs/Basic%20EKG%20Refresher.pdf, available since 2006.*

Mel, et al. "The NIST Definition of Cloud Computing". Recommendations of the National Institute of Standards and Technology. Nov. 16, 2015.

(Continued)

*Primary Examiner* — Yingchun He
(74) *Attorney, Agent, or Firm* — Kevin Jordan, Esq.; McGinn IP Law Group, PLLC (57) ABSTRACT

The current invention relates to a system for manipulating data sets. More specifically, the current invention relates to an interactive system allowing an expert to seamlessly filter complex databases as a tool to evaluate hypotheses. When longitudinal data are concerned, the system allows the user to sketch a chart illustrating the trend of a variable of interest over time, and the system selects records from a database in which the sketched trend is present.

20 Claims, 7 Drawing Sheets

(56) References Cited

OTHER PUBLICATIONS

Egenhofer et al., "Towards a Spatial Query Language: User Interface Considerations." VLDB. vol. 88. 1988.
Moro et al., "Data access services and automatic generation of cooperating interfaces." Cooperative Information Systems, 1998. Proceedings. 3rd IFCIS International Conference on. IEEE, 1998.
Bill, "Spatial data processing in environmental information systems." Environmental Informatics. Springer Netherlands, 1995. 53-73.

* cited by examiner

INTERACTIVE PATTERN DETECTION IN DATA SETS

BACKGROUND

The present invention relates generally to a tangible data set manipulation technique, and more particularly, but not by way of limitation, to an interactive system facilitating the filtering of complex databases.

One promise in the accumulation of extremely large corpora of data is the potential for technology to detect previously hidden patterns in the data.

SUMMARY

In an exemplary embodiment, the present invention can provide a computer-implemented pattern detection method, the computer-implemented method including: collecting one or more graphical representations of one or more hypotheses about a data set, translating the one or more graphical representations to one or more constraints, filtering the data set based on the constraints, and displaying the filtered data set and a statistical summary of the filtered data set corresponding to the one or more hypotheses or queries.

One or more other exemplary embodiments include a computer program product and a system.

Further details and embodiments of the invention will be described below. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various other ways.

As such, those skilled in the art will appreciate that the conception upon which this disclosure is based may readily be utilized as a basis for other structures, methods and systems embodying the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

The invention will now be described with reference to FIGS. 1-8, in which like reference numerals refer to like parts throughout. It is emphasized that, according to common practice, the various features of the drawing are not necessarily to scale. On the contrary, the dimensions of the various features can be arbitrarily expanded or reduced for clarity.

Figure 1:
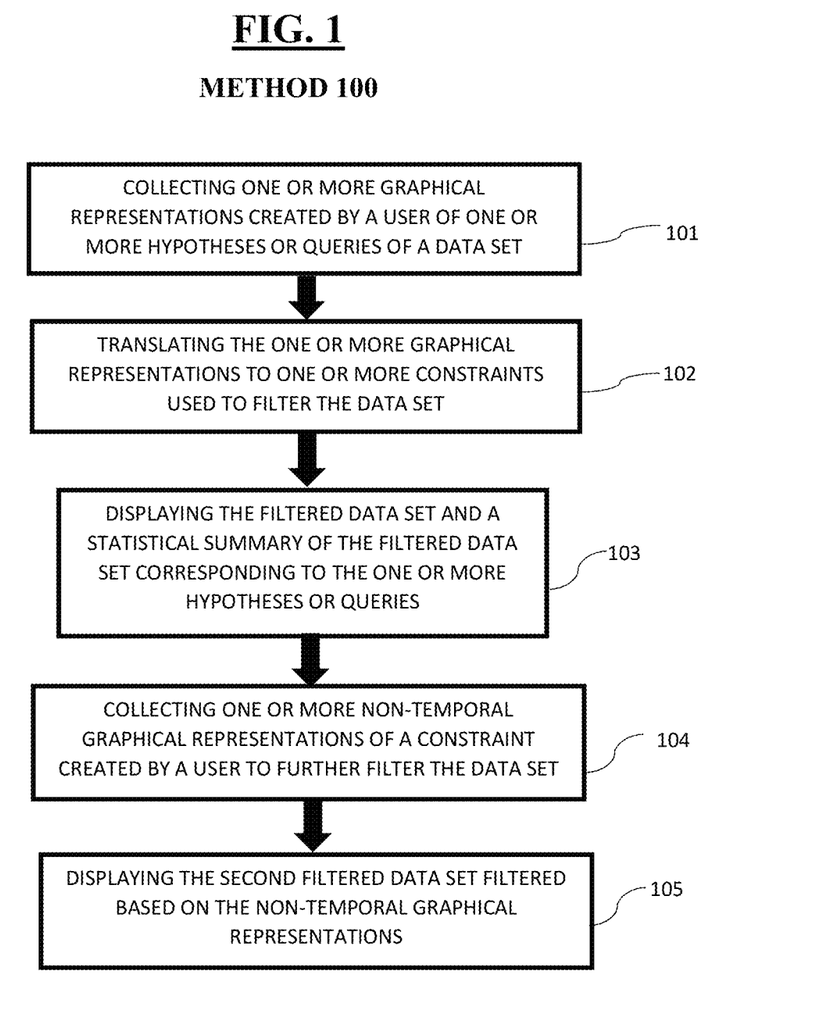
FIG. 1 exemplarily shows a high-level flow chart for a pattern detection method according to an embodiment of the present invention.

By way of introduction, with reference to the example depicted in FIG. 1, a pattern detection method 100 embodiment according to the present invention can include various steps for collecting one or more graphical representations of one or more hypotheses or queries and translating the graphical representations to one or more constraints used to filter the data.

Figure 6:
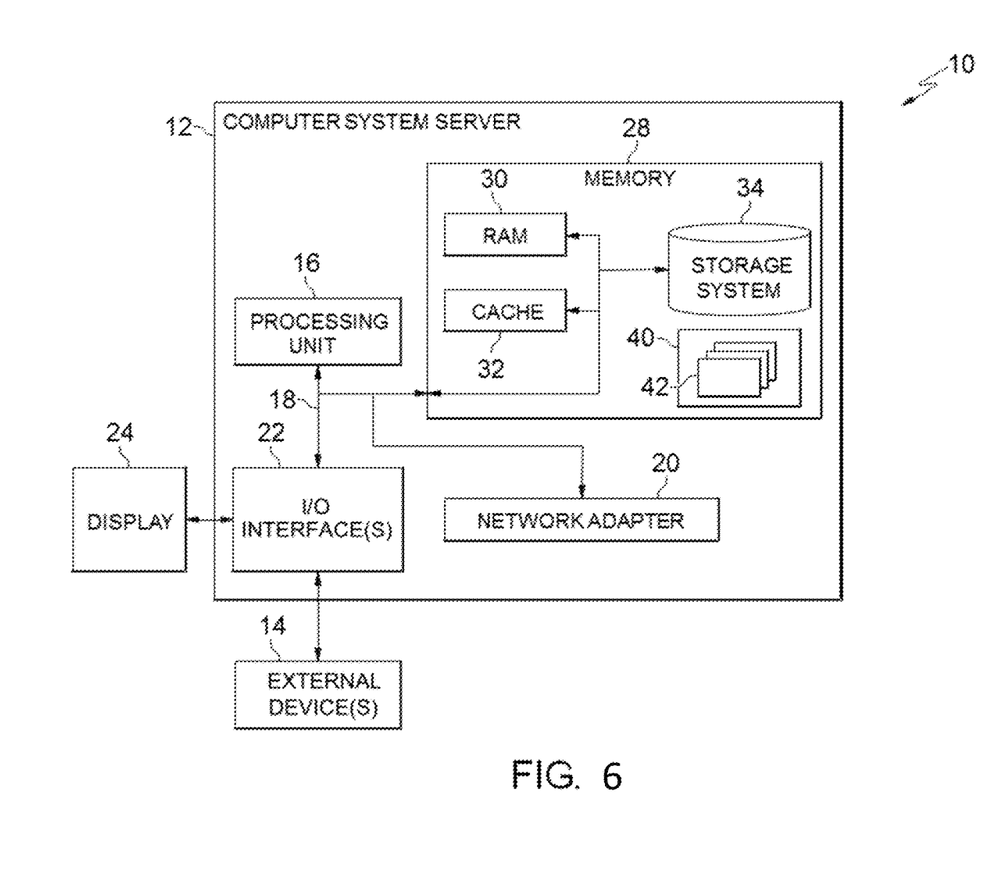
FIG. 6 depicts a cloud-computing node 10 according to an embodiment of the present invention.

By way of further introduction, with reference to the example depicted in FIG. 6, one or more computers of a computer system 12 according to an embodiment of the present invention can include a memory 28 having computer executable instructions stored therein, to perform the steps of FIG. 1. Further still, although one or more embodiments may be implemented in a cloud environment 50 (see e.g., FIG. 7), it is nonetheless understood that the present invention can be implemented outside of the cloud environment.

FIGS. 1-5, as referenced below, describe technology that can provide an interactive graphical interface for exploring hypotheses. When longitudinal data are concerned, a computer-implemented method 100 can (in some embodiments) incorporate an unstructured chart illustrating a trend of a variable of interest over time, and the method 100 selects records from a database in which the trend is present (e.g., as exemplarily depicted in FIG. 2).

In other words, a hypothesis of a trend in input data can be used to identify a data set having a similar trend, which can then be output by the computer. By way of example only, an input representing a hypothesized trend of a patient's symptoms can result in the output of a set of similar patients and their diagnosis or treatment plans.

By way of further examples: in a medical data scenario, a goal may to be identify patients in which a gradual decline in hemoglobin levels over time is observed; and in the financial domain, a goal may be to identify companies whose stocks' value decreased and then increased.

In some embodiments, data filtration may be constrained based on one or more of: exact values appearing in the hypothesized input, threshold values defined by the user, and through similarity analysis.

A similarity assessment may be based on a differential weight assigned to one or more specific segments of the input drawing. For example and referring to FIG. 2, the user can specify that the second downward sloped line can be weighted heavier than each of the other segments as this may indicate a decline in health (i.e., medical field), potential insider trading (i.e., stock market), etc.

In some embodiments, the method 100 can select lines that have the most similar features to input lines, based on multiple features of the line (e.g., segments, slope, range, etc.).

Figure 4:
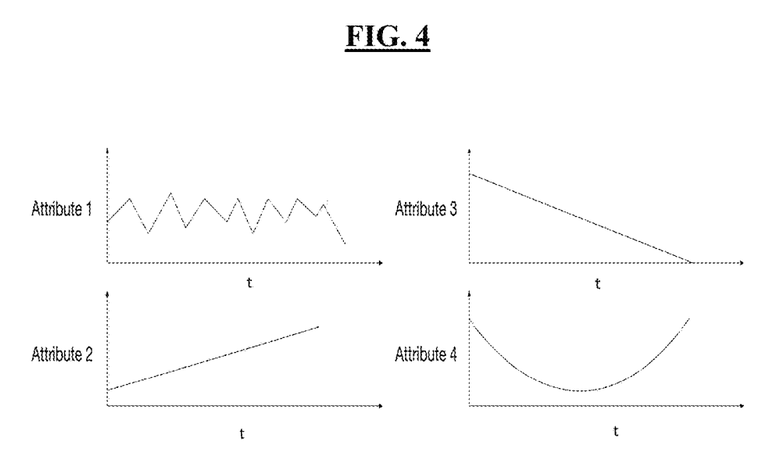
FIG. 4 exemplarily shows a filtering on multiple attributes of data according to an embodiment of the present invention.

Referring now to FIG. 4, FIG. 4 exemplarily depicts multiple input variables by the user in which are combined or weighted by the method 100. In some embodiments, a temporal pattern of a variable of interest may be repeated by the user on different periods for a single variable, for multiple variables on a single period (e.g., as exemplarily shown in FIG. 4 depicting multiple line segments for attributes (variables)), or using any combination thereof. Each chart (or line input by the user) forms a constraint condition on the database.

For example, referring to FIG. 4, a user (e.g., a doctor) can draw trend lines as inputs for weight ("Attribute 1") that fluctuates over the time period, blood sugar ("Attribute 2") that linearly increases (i.e., a constant slope) over the time period, mood ("Attribute 3") that decreases linearly over the time period, and overall sleep obtained ("Attribute 4") over the time period. The method 100 can correlate each attribute together with trends of other patients to find similar symptoms or treatment plans for the patient using the variation in the patient's symptoms over the time period as input in each of the graphs.

That is, the sketched charts of Attributes 1-4 of FIG. 4 may be combined (e.g. using Boolean operators). Sketched charts can also be combined by defining temporal relations between charts. Combined constraints can be used such that each constraint is applied separately on the database and only parts of the database fulfilling all constraints are returned. Alternatively, a set of constraints defined by user-drawn sketches can be analyzed sequentially by an order defined by the user.

Figure 3:
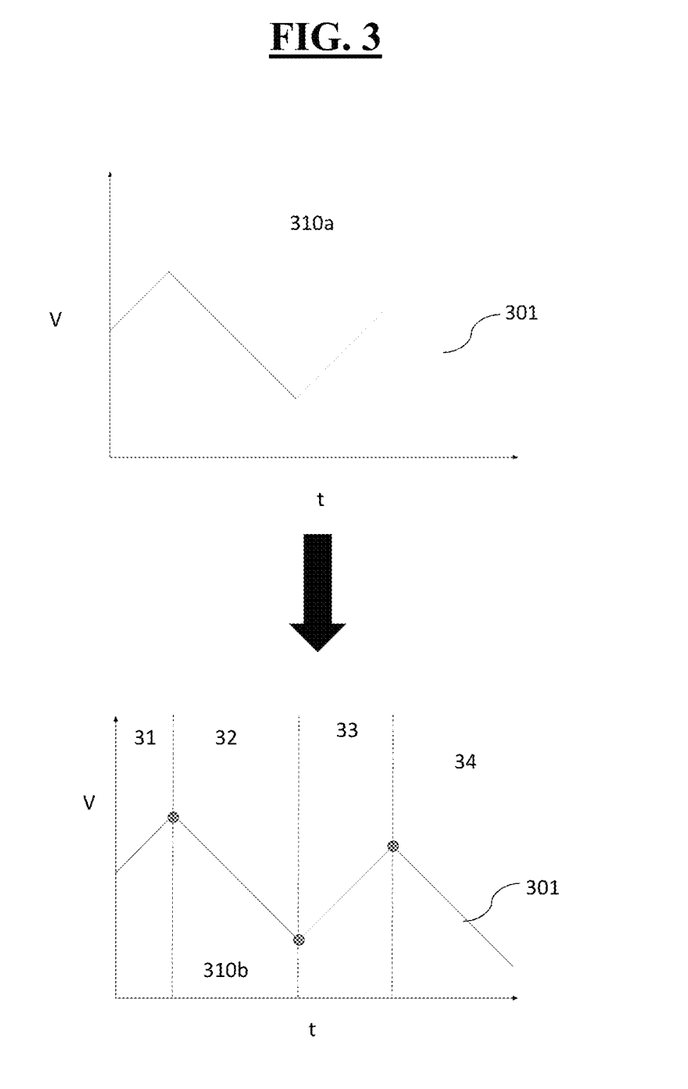
FIG. 3 exemplarily shows a translation of an unstructured line to a structured line, according to an embodiment of the present invention.

Referring now to FIG. 3, FIG. 3 depicts one embodiment in which a user input can be segmented into time variables or different sections. That is, in FIG. 3, an intention of the sketched line can be represented as a time variable and segmented into different sections such that different segments of the sketched line over different time periods can be analyzed separately. For example, a stock may be drawn as a trend over an entire year but can be split into revenue quarters to find trends such as seasonal decline (i.e., a stock for a clothing company only selling winter attire may decline in summer and rise in the fall).

Figure 5:
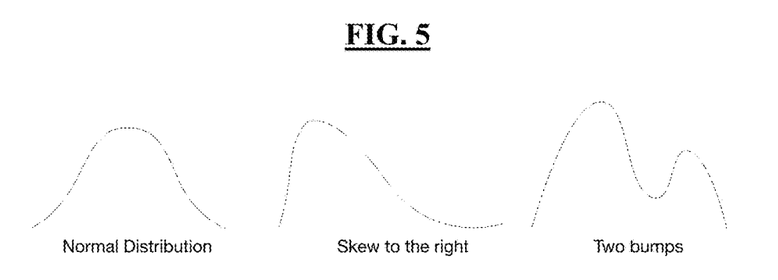
FIG. 5 exemplarily shows a sampling according to an embodiment of the present invention.

Referring now to FIG. 5, FIG. 5 exemplarily depicts a user inputting a preferred type of skew or statistical representation that the user wishes to obtain from the input data set. The charts may also include non-temporal data such as is exemplarily depicted in FIG. 5. In one embodiment, a chart plotting two parameters one against the other is generated or displayed (e.g. a plot of height vs weight). A chart can be based on real data or be a schematic representation with no real data plotted on it. A user may select an area of interest on the chart, and the data can be filtered accordingly to include records in which the defined relationship between variables is present (e.g., lakes which are both large and have pure water). In this embodiment, like when filtering temporal data, each chart is translated to a constraint on the data (e.g., a normal distribution of 10,000 patients in a particular data set, a distribution that skews to the right of the 10,000 patients in a particular data set, a "two bump" distribution (i.e., a larger amount of below average height and above average height patients) of the 10,000 patients in a particular data set, etc.). This may be an exact constraint or define an anchor for similarity analysis. Repeating the selection process using charts plotting other sets of variables on which a user marks her area of interest can be used to guide data filtration where each chart defines a constraint and charts can be used together to define a subset of the data.

In one embodiment, each chart can be assigned a weight by the user to be used when performing similarity analysis. A user may define a desirable level of the overall similarity to guide the selectivity of the similarity analysis report.

In one embodiment, higher dimensional charts may be drawn by the user, e.g. using virtual reality display. Each chart can define records or instances to be either included in or excluded from the filtered data set.

In another embodiment, a user can pick a representative record (e.g., a course in time of a patient) and use this record to select a cohort of records in which similar trends in variables of interest are observed in a certain time window.

In another embodiment, the user can graphically define at least one desired distribution of at least one variable (e.g., as exemplarily depicted in FIG. 5), which will be used to randomly select records in the dataset that will result in a subset of the data in which the desired distribution is found.

Based on the selection, summary statistics on the data can be provided, e.g. comparing a population fulfilling the set of constraints defined to the remaining population on the database.

Referring now to FIG. 1, in step 101, one or more graphical representations of one or more hypotheses about a data set are collected and input. In this example, a hypothesis can be input in the form of a query.

In step 102, the one or more graphical representations are translated to one or more constraints e.g., that can be used to filter the data set. In this example process, a computer algorithm is used to extract key features from a graphic representation. A few examples of features that can be extracted may include a time-frame for observations of a variable, minimum and maximum values of said variable, the slope of a trend or a set of slopes characterizing trends in the values of a variable.

In step 103, the filtered data set and a statistical summary of the filtered data set is displayed that corresponds to the one or more hypotheses or queries. In other words, a graphical representation can indicate a downward trend in a patient's weight as a hypotheses as a result of a particular disease. The data set for the particular disease can be filtered based on the constraint and the resulting filtered data set displayed, along with a statistical summary of patients having a similar weight trend that have the disease.

It is noted that steps 101-103 can be utilized for the exploration of data for which a data set is not yet determined. That is, steps 101-103 can generally query "data" (e.g., contained in any one or more databases) such that the results returned can be used as the "data set". For example, a doctor may not be aware of a particular data set that may be applicable to their current patient. In some embodiments, a doctor can generally query a database based on a hypotheses illustrated by the graphical representation, which may yield a candidate data set of potential patients. The doctor can then filter the returned data set further with further hypotheses or queries of the data set.

The graphical representation can include a line drawn on a two-dimensional or three-dimensional chart. Also, the user can define a plurality of graphical representations and specify the relations between them (i.e., "AND", "OR", "1 YEAR BEFORE", "AND NOT" to guide data filtration and constraint translation to further filter the data set. For example, as shown in FIG. 4, a stock broker can input four different graphical representations of four attributes and input that attributes two and three are "NOT" wanted for a stock search while a trend of attribute one "1 YEAR BEFORE" attribute four is desired.

In step 104, non-temporal or temporal graphical representations of constraints created by the user are collected to further filter the data set. The second filtered data set that is filtered based on the non-temporal graphical representations is displayed in step 105. That is, the user can input a graphical representation indicating that the data set they desire is a normal distribution of patients having heights typical of the population. Or, the user can filter the already filtered data set in step 102 by creating a "skew to the right" type of constraint indicating that the data set should be filtered to contain more patients below the average height than above.

Figure 2:
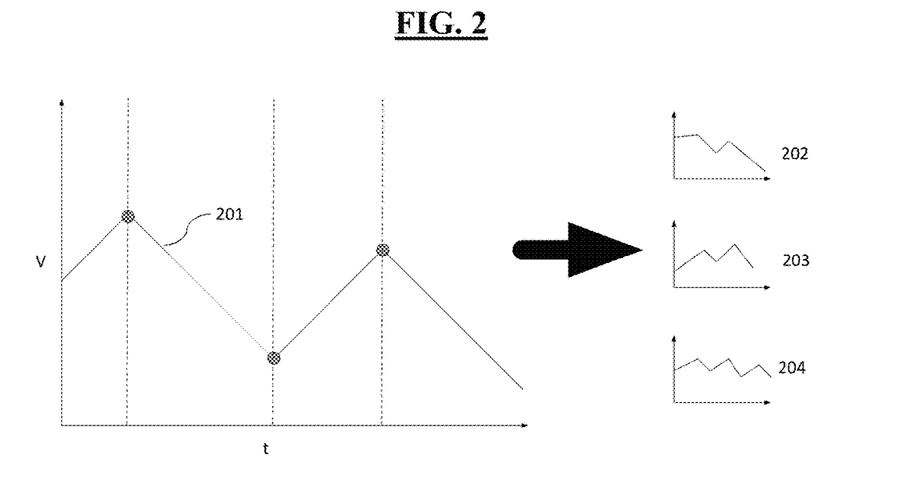
FIG. 2 exemplary shows a similarity-based analysis of a chart according to an embodiment of the present invention.

For example, with reference also to FIG. 2, a user can create and input a line. Then, the line input 201 can be interpreted by the system (e.g., depicted in FIG. 2) with respect to multiple features of the line (e.g., segments, slope, range, etc.). Then, lines 202-204 that have the most similar features (i.e., the user inputs a hypotheses for a variable "V" over time "t" as line 201 and similar lines (202, 203, 204) can be extracted e.g., according to an algorithm Alternatively, with reference to FIG. 3, a chart 310a on which a user has drawn a free line 301 representing a course in time "t" of variable "V" which the user is interested in. The free line is segmented and assessed for the slope, peak and trough levels of V (i.e., 310b) and those as constraints are translated (as described later). That is, the user's intended line in the top panel is interpreted by splitting the line into segments 31, 32, 33, and 34 to assess the intended hypotheses (i.e., how the variable "V" is changing over time "t"). The user can further filter the results for a particular desired distribution by creating a non-temporal graphical representation input such as shown in FIG. 5.

In some embodiments, the method 100 can facilitate the interrogation and manipulation of databases to detect complex patterns in a high dimensional space and their association with outcomes or events of interest.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, a schematic of an example of a cloud computing node is shown. Cloud computing node 10 is only one example of a suitable node and is not intended to suggest any limitation as to the scope of use or functionality of embodiments of the invention described herein.

Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

FIG. 6 depicts a system according to an embodiment of the present invention.

In the example depicted in FIG. 6, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16. In some embodiments, computer system/server 12 could be implemented as one or more network nodes of an environment e.g., as part of a network "cloud"—an example of which will be described with reference to FIG. 7.

Referring again to FIG. 6, bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 7:
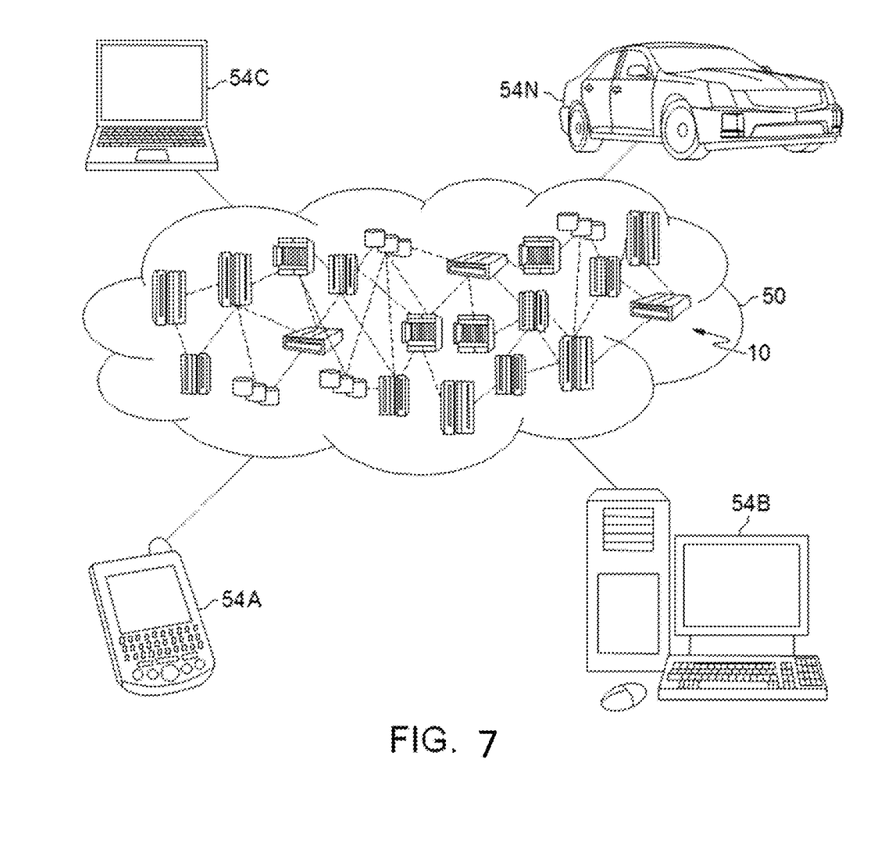
FIG. 7 depicts a cloud-computing environment 50 according to an embodiment of the present invention.

FIG. 7 depicts an example of a cloud computing environment according to an embodiment of the present invention. As shown, cloud computing environment 50 comprises one or more cloud computing nodes 10, one or more of which may include system 12, with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 7 are intended to be illustrative only and that computing nodes 10 and cloud computing environment 50 can communicate with any type of computerized circuit over any type of network and/or network addressable connection (e.g., using a web browser).

Figure 8:
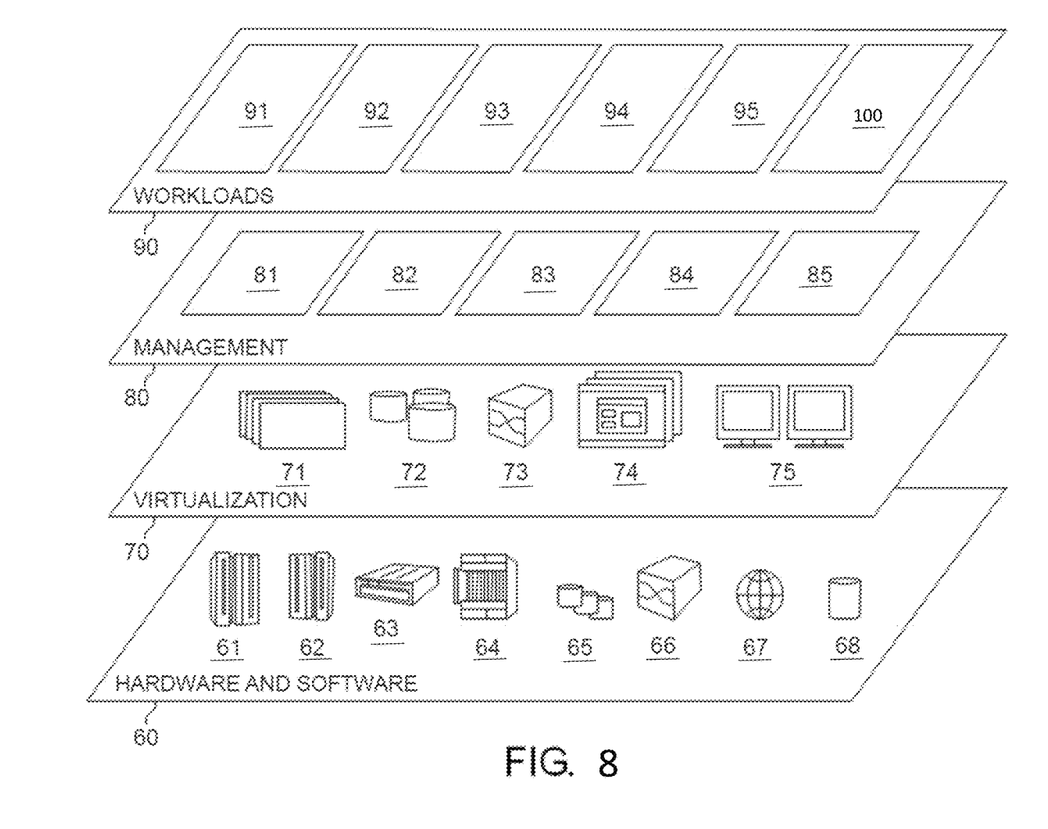
FIG. 8 depicts abstraction model layers according to an embodiment of the present invention.

FIG. 8 depicts an exemplary set of functional abstraction layers according to an embodiment of the present invention. In some embodiments, such functional abstraction layers can be implemented in cloud computing environment 50 (FIG. 7). It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and pattern detection processing 100 (e.g., the method 100) in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented pattern detection method, the method comprising:
    collecting one or more graphical representations of one or more hypotheses of a data set;
    translating the one or more graphical representations to one or more constraints;
    filtering the data set based on the constraints;
    displaying a first filtered data set corresponding to the one or more hypotheses, in response to said filtering;
    creating a non-temporal graphical representation input for a particular statistical desired distribution; and
    filtering the first filtered data set based on the non-temporal graphical representation input as a second constraint unrelated to the constraints to obtain a second filtered data set.

2. The computer-implemented method of claim 1, wherein the graphical representations are selected from a group consisting of:
    a line drawn on a two-dimensional chart; and
    a line drawn on a three-dimensional chart.

3. The computer-implemented method of claim 1, wherein the graphical representations comprise a temporal graphical representation of an attribute.

4. The computer-implemented method of claim 1, wherein at least two of the graphical representations include a defined relationship and wherein said translating the one or more graphical representations to one or more constraints further comprises translating the defined relationship.

5. The computer-implemented method of claim 1, wherein the one or more graphical representations further comprise one or more non-temporal graphical representations and wherein said filtering is based on at least one translated constraint representation of the non-temporal graphical representations.

6. The computer-implemented method of claim 5, wherein the non-temporal graphical representations include a statistical distribution for the data set and a relationship between two or more variables, and
    wherein the displaying displays a statistical summary of the filtered data set.

7. The computer-implemented method of claim 1, wherein said translating the one or more graphical representations to one or more constraints further comprises translating a different set of the one or more graphical representations to one or more constraints; and
    wherein the data set is created from the filtered data based on the translated different set of the one or more graphical representations.

8. The computer-implemented method of claim 1, embodied in a cloud-computing environment.

9. A computer program product for pattern detection, the computer program product comprising a computer-readable storage medium having program instructions embodied therewith, the program instructions executable by a computer to cause the computer to perform:
    collecting one or more graphical representations of one or more hypotheses of a data set;
    translating the one or more graphical representations to one or more constraints;
    filtering the data set based on the constraints;
    displaying a first filtered data set corresponding to the one or more hypotheses, in response to said filtering;
    creating a non-temporal graphical representation input for a particular statistical desired distribution; and
    filtering the first filtered data set based on the non-temporal graphical representation input as a second constraint unrelated to the constraints to obtain a second filtered data set.

10. The computer program product of claim 9, wherein the graphical representations are selected from a group consisting of:
    a line drawn on a two-dimensional chart; and
    a line drawn on a three-dimensional chart.

11. The computer program product of claim 9, wherein the graphical representations comprise a temporal graphical representation of an attribute.

12. The computer program product of claim 9, wherein at least two of the graphical representations include a defined relationship and wherein said translating the one or more graphical representations to one or more constraints further comprises translating the defined relationship.

13. The computer program product of claim 9, wherein the one or more graphical representations further comprise one or more non-temporal graphical representations and wherein said filtering is based on at least one translated constraint representation of the non-temporal graphical representations.

14. The computer program product of claim 9, wherein the non-temporal graphical representations include a statistical distribution for the data set and a relationship between two or more variables, and
   wherein the displaying displays a statistical summary of the filtered data set.

15. The computer program product of claim 9, wherein said translating the one or more graphical representations to one or more constraints further comprises translating a different set of the one or more graphical representations to one or more constraints; and
   wherein the data set is created from the filtered data based on the translated different set of the one or more graphical representations.

16. A pattern detection system, comprising:
   a processor; and
   a memory operably coupled to the processor, the memory storing program instructions executable by the processor, to cause the processor to perform:
      collecting one or more graphical representations of one or more hypotheses of a data set;
      translating the one or more graphical representations to one or more constraints;
      filtering the data set based on the constraints;
      displaying a first filtered data set corresponding to the one or more hypotheses, in response to said filtering;
      creating a non-temporal graphical representation input for a particular statistical desired distribution; and
      filtering the first filtered data set based on the non-temporal graphical representation input as a second constraint unrelated to the constraints to obtain a second filtered data set.

17. The system of claim 16, wherein the graphical representations are selected from a group consisting of:
   a line drawn on a two-dimensional chart; and
   a line drawn on a three-dimensional chart.

18. The system of claim 16, wherein the graphical representations comprise a temporal graphical representation of an attribute.

19. The system of claim 16, wherein at least two of the graphical representations include a defined relationship and wherein said translating the one or more graphical representations to one or more constraints further comprises translating the defined relationship.

20. The system of claim 16, embodied in a cloud-computing environment.

* * * * *